No. 694,528. Patented Mar. 4, 1902.
H. B. CARY.
VOTING MACHINE.
(Application filed Oct. 8, 1901.)
(No Model.) 5 Sheets—Sheet 1.
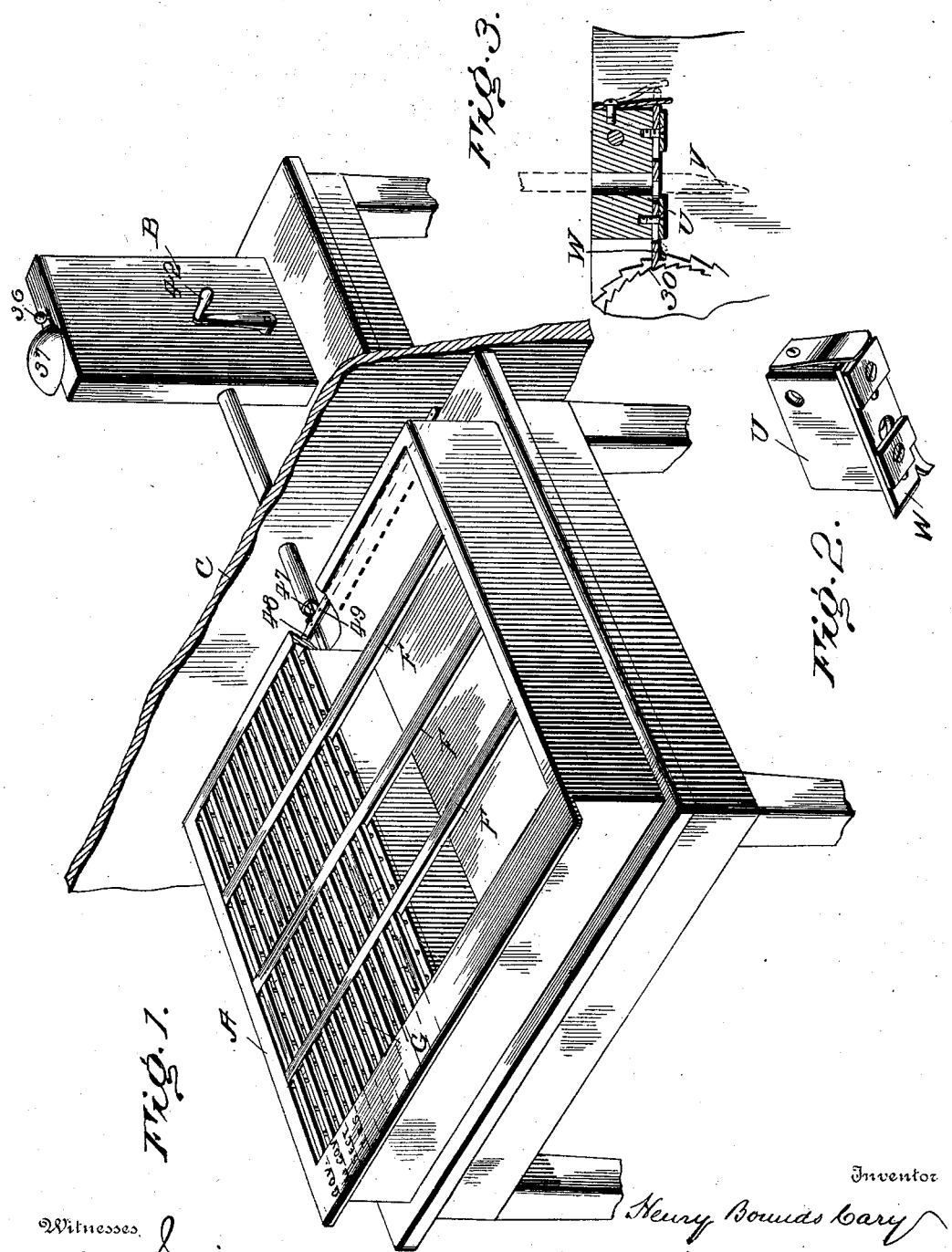
Inventor
Henry Bounds Cary No. 694,528. Patented Mar. 4, 1902.
H. B. CARY.
VOTING MACHINE.
(Application filed Oct. 8, 1901.)
(No Model.) 5 Sheets—Sheet 2.
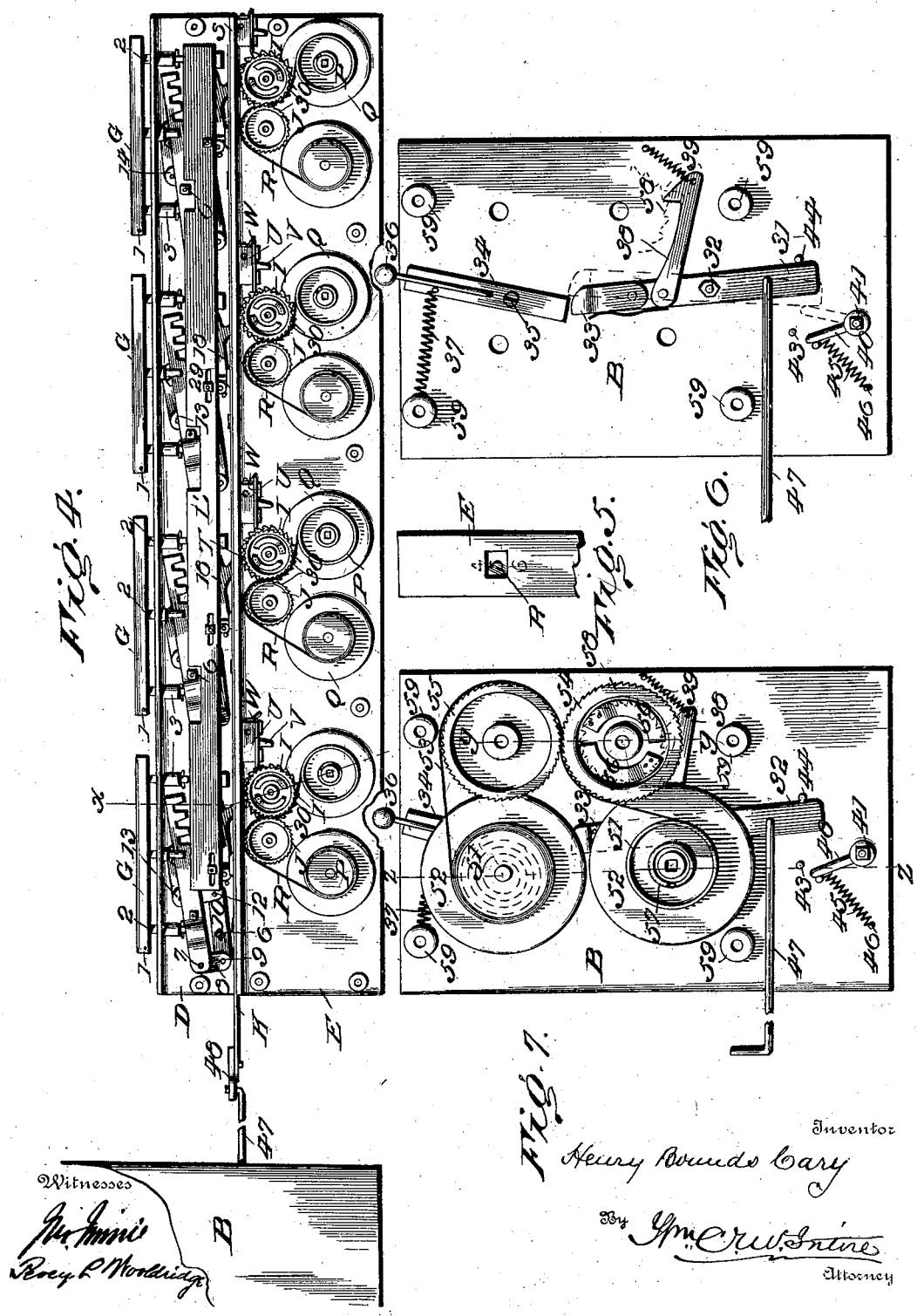

No. 694,528. Patented Mar. 4, 1902.
H. B. CARY.
VOTING MACHINE.
(Application filed Oct. 8, 1901.)
(No Model.) 5 Sheets—Sheet 3.
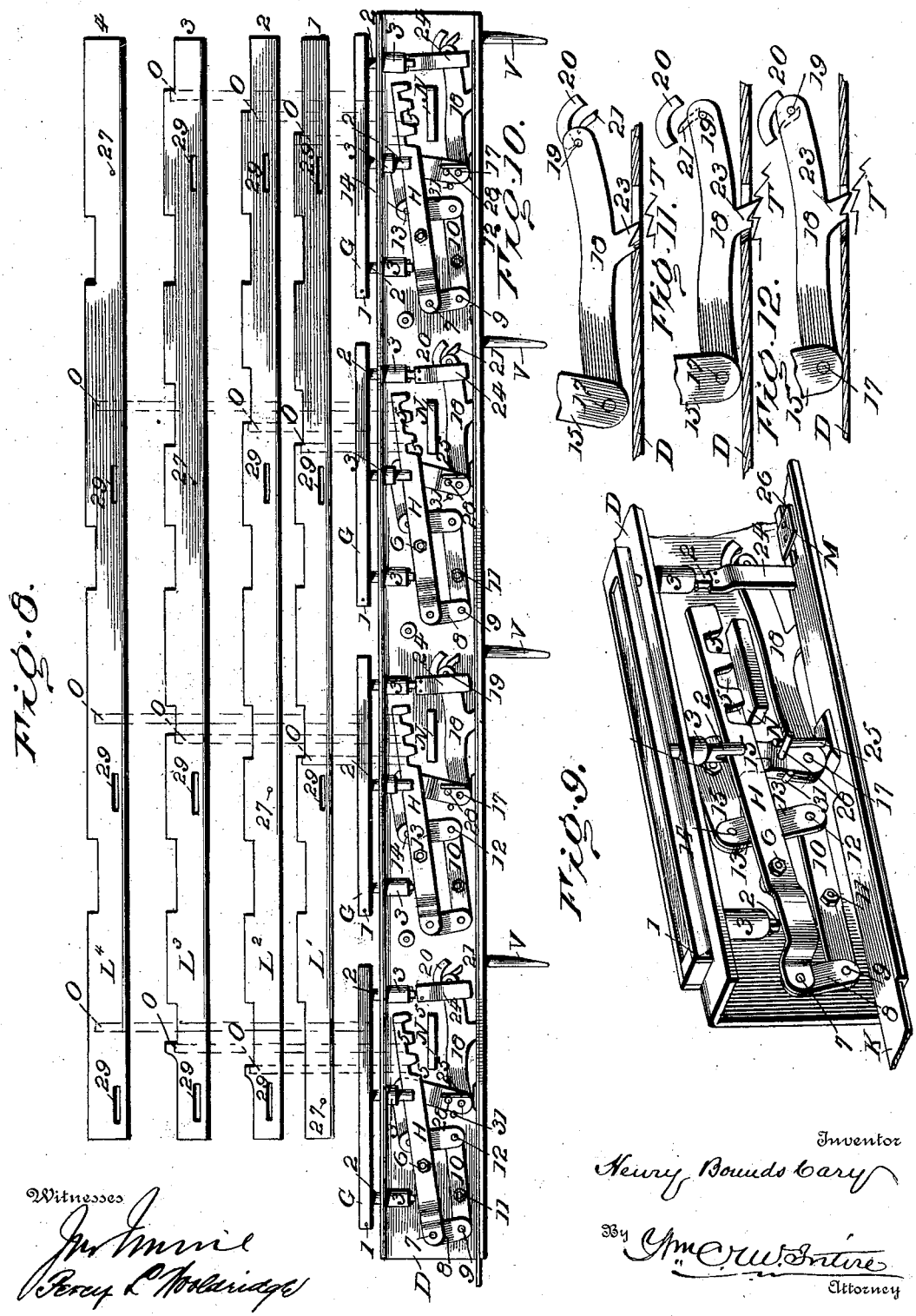
Witnesses
Inventor
Henry Bounds Cary
By
Attorney No. 694,528. Patented Mar. 4, 1902.
H. B. CARY.
VOTING MACHINE.
(Application filed Oct. 8, 1901.)
(No Model.) 5 Sheets—Sheet 4.
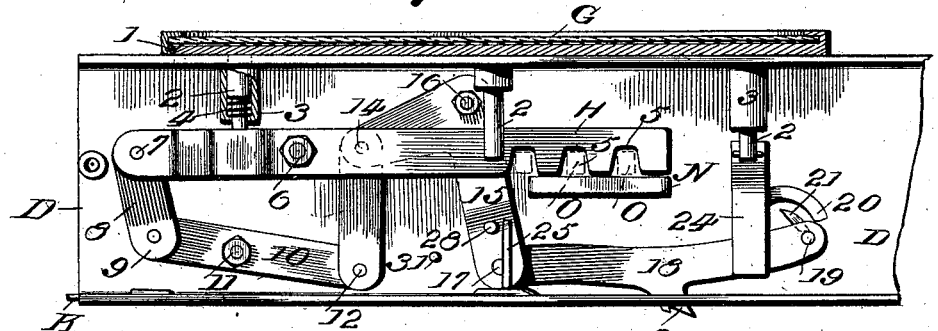
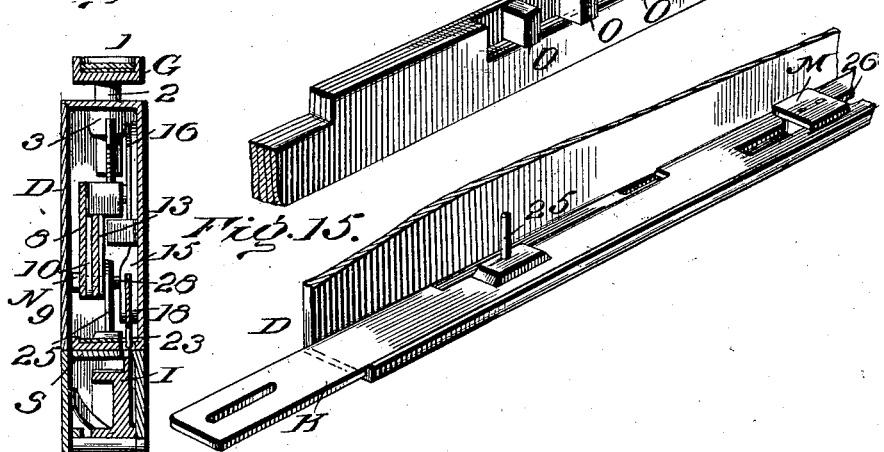
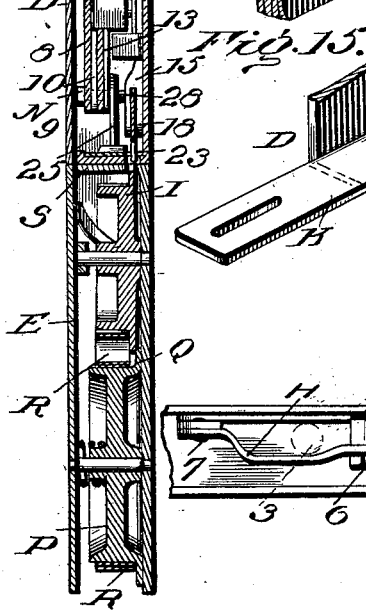
Witnesses Inventor
Henry Bounds Cary
By Jm C. R. W. McIntire
Attorney No. 694,528. Patented Mar. 4, 1902.
H. B. CARY.
VOTING MACHINE.
(Application filed Oct. 8, 1901.)
(No Model.) 5 Sheets—Sheet 5.
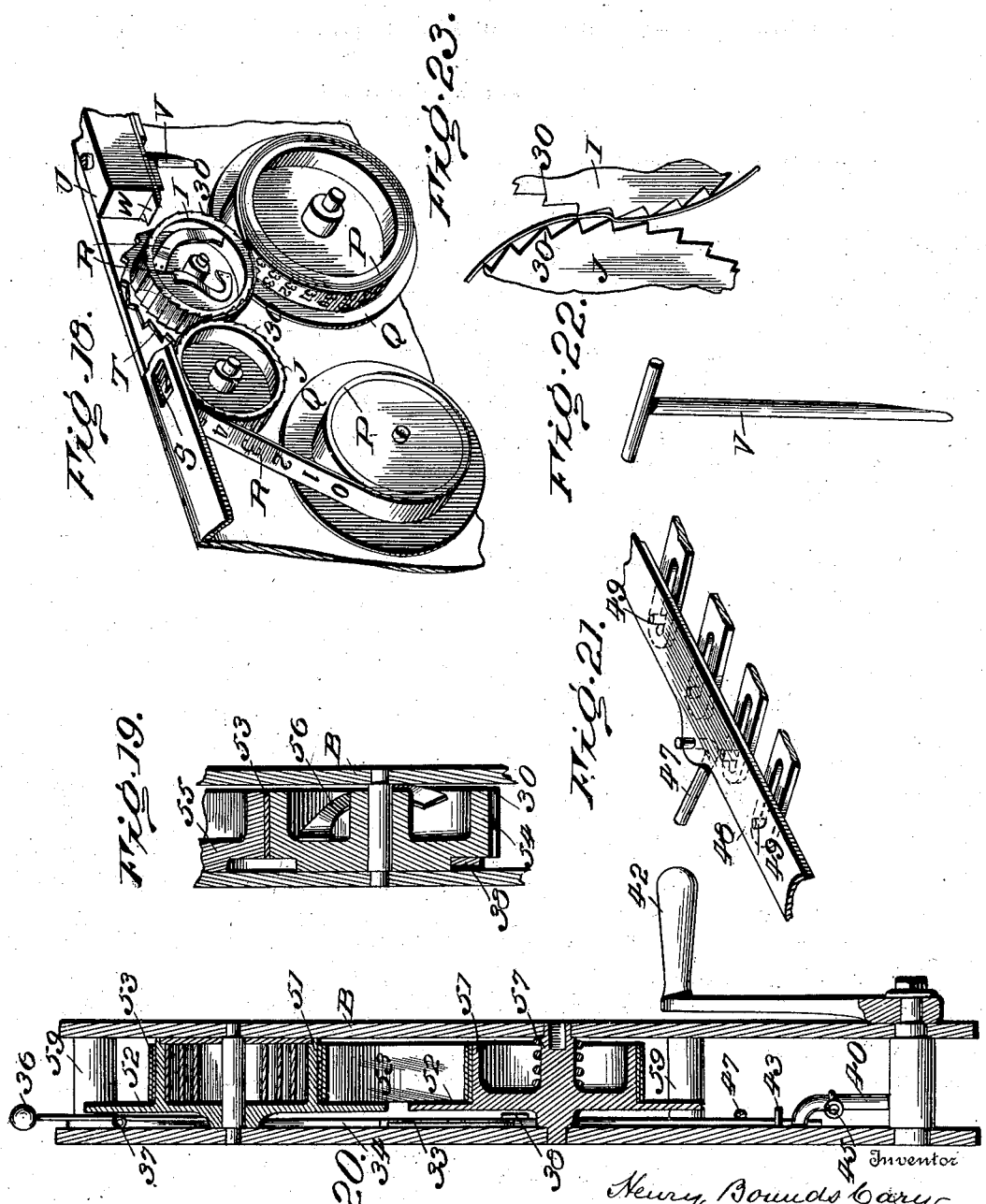

UNITED STATES PATENT OFFICE.

HENRY BOUNDS CARY, OF LOS ANGELES, CALIFORNIA.

VOTING-MACHINE.

SPECIFICATION forming part of Letters Patent No. 694,528, dated March 4, 1902.

Application filed October 8, 1901. Serial No. 78,022. (No model.)

*To all whom it may concern:*

Be it known that I, HENRY BOUNDS CARY, a citizen of the United States, residing at Los Angeles, in the county of Los Angeles and State of California, have invented certain new and useful Improvements in Voting-Machines; and I do hereby declare the following to be a full, clear, and exact description of the invention, such as will enable others skilled in the art to which it appertains to make and use the same.

My invention has for its object to provide a machine fulfilling all of the legal requirements and, at the same time, thoroughly guarding against any fraudulent action on the part of the voter or the supervising official, and consequently protecting both from improper suspicion, thus rendering an election pure in every respect and also providing a permanent and reliable record for future reference in cases of contest or charges of fraud.

With these ends in view, my invention consists of a machine or apparatus hereinafter and fully described which shall accurately record the vote or votes of the voter, which can only be operated after it has been duly set by the judges or supervisors and which cannot be again adjusted or set for action until the judges or supervisors have publicly announced the fact that each voter in turn has recorded his vote.

In order that those skilled in the art to which my invention pertains may fully understand its construction and operation and that those for whose use it is designed may know how to arrange and operate the same, I will proceed to describe in detail the various features of construction and arrangement and the manner in which it is to be used to secure the proper results, referring by letters to the accompanying drawings, in which—

Figure 1 is a perspective view of the machine suitably arranged for operation and showing a partition between the two parts of the same to separate the voter's booth from the room of the judges or supervisors of election. Fig. 2 is a perspective view of a locking device designed to protect the record of individual votes when the operating devices are separated. Fig. 3 is a longitudinal section of said locking device, showing its relation to one of the registers, a releasing-key being shown in dotted lines. Fig. 4 is a front elevation of the mechanism by which the individual votes are registered, the front plate being removed to clearly expose said mechanism. Fig. 5 is a detail plan view of the lower section of the construction shown at Fig. 4 and showing how the registered votes are exposed to view. Fig. 6 is a front elevation of that portion of the machine which is located in the room occupied by the judges or supervisors and which is under their exclusive control. Fig. 7 is a similar view with the front plate and exterior mechanism removed to expose the interior mechanism by which the serial number of votes is registered after each voter has registered his vote and left the booth and notice of the same is given to the public by a bell or other alarm. Fig. 8 is a front elevation of the upper section of the mechanism shown at Fig. 4 removed from its lower section and with the front plate removed and the four locking-plates also removed from the case and shown in plan view above the case, the lowest one being next above the case and the others in the order of their adjustment within the case. Fig. 9 is an enlarged perspective view of a portion of the case shown at Fig. 8 and with the front plate removed. Fig. 10 is a detail section showing in elevation one of the dog-levers and its relation to ratchet-wheel on one of the registers and to a cam which guides the movements of said dog before it has been affected by the operating key or button. Fig. 11 is a similar view showing the relation of the several parts after the key or button has been depressed. Fig. 12 is a similar view showing the relation of the parts after pressure has been removed from the key or button and the dog-lever is moving back toward its normal position shown at Fig. 10. Fig. 13 is a side elevation of the parts shown at Fig. 9, but on enlarged scale, and with key or push-button shown in longitudinal section. Fig. 14 is a cross-section taken on the line $xx$ of Fig. 4, with the two sections having their front plates in place. Fig. 15 is a detail perspective of one end of the upper section shown at Fig. 13 and showing the reciprocating bar which operates the several locking-plates shown removed at Fig. 8. Fig. 16 is a detail perspective, partly in section, showing the several locking-bars in their assembled relation. Fig. 17 is a detail top or plan view of a portion of the upper section shown at Fig. 13 and with its top plate or cover removed. Fig. 18 is a detail perspective, on enlarged scale, of a portion of the lower or registering section shown in elevation at Fig. 4. Fig. 19 is a detail section taken on line $y\,y$ of Fig. 7. Fig. 20 is a vertical section taken on the line $z\,z$ of Fig. 7. Fig. 21 is a detail perspective view showing the connection between the several reciprocating bars shown in perspective at Fig. 15 and the operating rod or arm connected with the judges' section. Fig. 22 is a perspective view of an independent key, similar at its lower end to the series of fixed keys shown on the upper section in Fig. 8, for releasing the latch of the lock shown at Figs. 2 and 3 when it is desired to reset the tape reels or records; and Fig. 23 is a partial plan view, on enlarged scale, showing the construction of tape-moving gears and their relation to said tapes.

Similar letters of reference and numerals hereinafter used indicate like parts in the several figures of the drawings.

The machine is composed of two parts, one of which, A, is located in the voters' booth and the other, B, in the judges' room, the booth and judges' room being divided or separated by a partition C and the two parts of the machine being operatively connected, as will be hereinafter explained.

That part of the machine which is located in the voter's booth consists of a series of cases made in two sections D and E, connected together, as will be presently explained. One of these dual-section cases is employed for each office or measure to be voted for, and the mechanism for registering the choice of the voter is similar in every respect as to the several candidates or measures. For instance, if the machine be used for a State election for governor, lieutenant-governor, secretary, and treasurer there would be four dual cases, one for each office, and each case would have a duplication of registering mechanism to the extent of the number of candidates—say one for the Republican, one for the Democratic, and one for Populist, and so on—and for each additional office a similar dual case would be used. These several cases are arranged parallel with each other and within any suitable outer casing or cabinet, as clearly shown at Fig. 1, the names of the several candidates for a given office being separated by transverse divisional slats or bars F, which serve, as will be hereinafter explained, to prevent any tampering with designations or names contained in the push plates or buttons. It being understood that all of these dual cases are duplicates of one another, I will now proceed to describe the construction of the same.

The upper section D is a rectangular metal case adapted to be put together in such manner that the interior mechanism may be readily assembled, as clearly indicated at Figs. 4, 8, 9, 13, and 14. The contained mechanism is located between and all wheels and gears are journaled in the front and back plates of this case, as most clearly shown at Fig. 14. G are push-plates for receiving the names of the candidates to be voted for, and they preferably are of box form, with a flanged opening on top to expose any printed matter upon a card or strip of paper located within the box and which is covered by a piece of glass which is slid over said card or paper from one end of the box, said end being hinged, as clearly shown at 1, Fig. 13, which when closed prevents the removal of the card or strip, and when the complete machine is assembled and located for use the divisional strips F of the cabinet prevent the hinged ends referred to from being opened. These push-plates are provided with three vertical studs 2, the two end ones passing through guide-boxes 3 and against restoring or lifting springs 4 (see Fig. 13) and the central one having its lower end bifurcated to straddle an operating lever or arm H, the free end of which is provided on the under edge with a series of gates 5, one less in number than the number of push-plates and registering devices in the case. This lever H is pivoted at 6 to the case, so that it may be rocked upon said pivot by the downward movement of the bifurcated stud 2 and the action of the dog-lever hereafter described. The end of the arm H opposite the gated end is pivoted at 7 to one end of a short arm 8, the opposite end of which is pivoted at 9 to an arm 10, pivoted at 11 to the case and at 12 to one end of another arm 13, the opposite end of which is pivoted at 14 to a bell-crank lever 15, pivoted at 16 to the case, and at its lower end at 17 to a dog-lever 18, the free end of which is provided with a short pin or stud 19, adapted to traverse a two-part cam 20 21, secured in position to the case D. The dog-lever 18 is formed with a dog or tooth 23 to interlock at the proper time with the ratchet-teeth (see Figs. 10, 11, and 12) on the prime tape-moving ratchet wheel or gear I, between which and the teeth or gears on the adjacent gear-wheel J the tape is gripped with sufficient tenacity to secure positive and uniform travel of the same and to prevent any slip or retrograde action. The dog-lever 18 is held in operative position by a guide-plate 24, secured to the case D.

Arranged in the bottom of the case D is a reciprocating bar K, provided with a series of vertical pins 25, equal in number to the number of push-plates G and to the number of locking-plates $L'\ L^2\ L^3\ L^4$. This bar K is slotted at suitable localities, as seen at 26, Figs. 9 and 15, and held in proper position by T-shaped pieces M.

Below the gated ends of the operating levers or arms H and in a plane coincident with the lowest position attained by the same are arranged stops N, secured to the side of the case and which constitute platforms between which and the gated ends of the levers or arms H the locking-blocks O on the locking-plates L' L² L³ L⁴ travel, as will be hereinafter explained, to lock all other push-plates but the one which has been operated by the voter to record his vote as to any particular candidate.

The locking-plates L' L² L³ L⁴ are each formed with a single round or other desired shaped orifice 27, (see Fig. 8,) adapted to receive a pin 28 on each of the bell-crank levers 15, and with three longitudinal slots 29, through which pass the vertical pins 28 on the other bell-crank levers. The orifices 27 and slots 29 in the locking-plates are so located that orifice 27 of each plate fits over the pin 28 of its respective locality and the slots 29 over the remaining pins 28, according to the number of registering mechanisms.

The locking-plates are each provided with locking-blocks O at such predetermined localities that when the several plates are properly located they will appear in groups, as shown at Fig. 16, and in numbers of one less than the whole number of registering mechanisms and equal to the number of gates 5 in the lever-arms H, so that when any particular push-plate G is depressed to register a vote the multiplying-lever H and its connections being vibrated the pin 28 on the arm 15, contacting with the vertical pin 25 on the push-bar K, will cause the latter to be reciprocated in an obvious direction, and as each one of the locking-plates is connected through the medium of its orifice 27 with one of the pins 28 on the bell-crank levers 15 it follows that the particular locking-plate connected with the pin 28 of the particular registering mechanism used will be also reciprocated in the same direction as the push-bar K, and consequently the locking-blocks O on said plate will be brought between the platforms N and the lower end of the tooth-shaped portions and out of register with the gates 5 of the lever-arms H of all the other recording mechanisms, and hence after a given push-plate has been depressed to register a vote none of the other push-plates or registering mechanisms can be operated until all of the parts are restored to normal and operative relation, which is done by reciprocating the push-bar K back to its normal position, as will be hereinafter described, which movement causes the pin 25 to bear against the pin 28 of the bell-crank lever 15, which is rocked to its normal position, carrying the particular locking-plate back with it and raising the free (gated) end of the lever-arm H into position to be again depressed by the bifurcated stud 2, when desired. So in each case the particular locking-plate which is actuated by any particular registering mechanism will in turn lock all the other registering mechanisms. It will be seen that when any particular push-plate has been depressed to register a vote the lever-arm H, through the medium of whose downward movement the dog-lever 18 is operated, cannot be again depressed by the bifurcated stud 2 until the arm H is restored to its normal position, as just explained, and therefore but one vote can be recorded on that particular mechanism by the same voter, for, as will be presently explained, the machine is reset by the judges only after the voter has left the booth.

I will now proceed to describe how the mechanism connected with the upper section D of the voters' case acts upon the registering mechanism in the lower section E.

Within the case E below the dog-lever 18 of the upper section are journaled two tape-carrying reels P, (see Fig. 18,) each provided on one face with a flange Q to constitute guides for the tape R and to prevent contact of the same with the back of the case should there be at any time any slack in the tape, the front of the case when in position constituting a guide for the tape on that side. Above the reels P are arranged a prime tape-moving ratchet wheel or gear I and a secondary tape-moving gear J, which are journaled in an obvious manner in the front and back plates of the case E and are held against any accidental rotation by friction-springs R, arranged diametrically within one or both of said gears and bearing against the front plate of the case when in place. The periphery of each of these gears is provided with saw-teeth cogs 30, inclined in opposite directions and are so adjusted with reference to each other that in the absence of the tape R the teeth will mesh sufficiently to produce synchronous movement of the two gears, and yet permit the interposition of the tape R, and hence when the tape is so introduced the teeth of the two gears bite said tape sufficiently to secure absolute and positive travel of the same when the gears are revolved. The top of this section E is provided with a small peep-hole or window S, through which the number on the tape which is in register therewith may be seen. The shaft of the reel P on the right-hand side is adapted to receive a key passing through the front plate and by means of which the tape R is reeled up after it has served its purpose and is to be again used. The tape has printed upon it numbers in serial order and at such predetermined distances apart that each successive movement of the prime tape-gear I will expose at the window S each succeeding number on the tape. The prime tape-gear I is provided with a ratchet-gear T, which is operated upon by the dog-tooth 23 on the lever 18, as clearly illustrated at Figs. 10, 11, and 12.

U is a lock provided with a spring-latch W, adapted to interlock with the gear-teeth 30 on the prime tape-gear I when the two sections D and E are separated and the keys V, projecting from the upper section D and into the lock U, are withdrawn, and hence at such time it is impossible to move the gear I, and therefore the tape R likewise cannot be moved to alter the register made by it and exposed at the window S; but when the two sections D and E are together in proper relation the fixed keys V on the base of the upper section D operate to hold the spring-latch W of the lock away from the gear-teeth 30 of the tape-gears I, and hence all of said gears are free to be moved by the dog-lever 18, which I will now describe.

As the push-plate G is depressed and the bell-crank lever 15 is rocked, as heretofore explained, the dog-lever 18 is pushed forward, and during this forward movement the pin 19 in the free end of said lever travels under the lower face of the part 21 of the dual cam secured to the case, and said lever 18 thus has its forward end forced downwardly and the dog 23 into contact with the ratchet T of the prime tape-gear I and held in such contact during the entire forward movement of the dog and until the pin 19 passes beyond said cam portion 21, when the dog becomes absolutely inoperative for further movement of the ratchet and cannot act again until it is restored to its normal position by the rearward reciprocation of the push-bar K, as heretofore explained, which movement, by reason of the dog 23 riding upon the tooth of the ratchet T, lifts the free end of the lever 18, and the pin 19 therein then rides upon the upper face of the cam portion 21 and between it and the lower curved face of the cam portion 20, and consequently as the lever is drawn back through the action of the push-bar K the dog-tooth 23 is lifted up and travels rearwardly to its normal position and the pin 19 to position to again contact with the under side of the cam portion 21. The extent of rearward movement of the dog-lever 18 is controlled by a stop-pin or projection 31. (See Fig. 13.)

I have now described the construction and arrangement of the two sections D and E and how the mechanism of each is operated in the act of voting, and I will now explain how the machine is restored to its normal condition after voting and in doing so call special attention to that portion of the machine shown at B in Fig. 1 and its details of construction shown in Figs. 6 and 7.

Within the case B is pivoted a lever 31, pivoted at 32, the upper end provided with a pivoted spring nose or tappet 33, adapted to contact with the lower end of an arm 34, pivoted at 35 and carrying at its upper end a bell-hammer 36, extending through the top of the case B and adapted to strike a bell 37, (see Fig. 1,) secured to the top of the case. The arm 34 is vibrated upon its pivot 35 by the tappet 33, and the recoil of a spring 37 causes the hammer 36 to strike the bell in an obvious manner.

To the lever 31 is pivoted a latch-pawl 38, the free end of which and a stud on the case are connected by a coil-spring 39. The lever 31 is vibrated against the action of the spring 39 by a radial arm 40 on a shaft 41, which is rotated by a crank 42 on the outside or front of the case B, stops 43 and 44 limiting the travel of the lower end of the lever 31 in either direction, a coil-spring 45 between the end of the radial arm 40 and a stud 46 returning said arm and the crank 42 to normal positions.

The lower end of the lever 31 is connected by a bar 47 to a transverse bar 48, (see Fig. 21,) and the ends of the series of push-plates K are slotted longitudinally and connected to a series of pins 49, projecting from the bar 48, and consequently when the crank 42 is turned to the right and the bar 47 is pulled by the vibrating lever 32 it will cause the bar 48 to pull back any one or more of the push-bars K which may have been reciprocated in an opposite direction by the action of any one or more of the recording mechanisms in the section E, as already described, and hence, as heretofore explained, such registering mechanisms will be reset or restored to normal position, while the effect of turning the crank 42 and resetting the registering mechanism can in no wise affect that part of the machine located in the voters' booth, and hence it is beyond the control of the judges, except for the purpose of resetting it for successive voters after each has left the booth and his departure announced by the sounding of the bell 37. From what has just been stated it will be apparent that unless the judges reset the machine and make announcement of a vote no one entering the booth can operate the machine or vote.

In order that a register may be kept of the number of persons entering the voters' booth and voting, the case B is provided with two tape-reels 51, having flanges 52 to support and guide a record-tape 53 in substantially the same manner as already described with reference to the tape-reels P of the registering mechanism in section E. This tape is printed with serial numbers and passes from the lower reel between two tape-moving gears 54 55, and hence to the upper reel, as clearly shown at Fig. 7, the peripheries of the gears 54 and 55 having saw-tooth cogs similar to the tape-gears I J previously described and for the same purpose.

The gear 54 is provided with friction-springs 56 and the reel 52 with a friction coil-spring 57 to steady said gear and reel in an obvious manner.

The gear-wheel 54 is provided with a ratchet (shown in dotted lines in Fig. 7 and indicated at 58 in Fig. 6) into which the latch 38 catches, so that when the lever 31 is vibrated by the judges to reset the voters' section of the machine and to announce that a voter has cast his ballot the latch 38 will cause the gears 54 and 55 to be rotated and the tape 53 to travel a distance equal to that between the numbers on said tape, and thus present to view at an opening in the top of the case B numbers representing successively the whole number of persons who have voted.

The front and rear plates of the case B and the contained mechanism are secured in proper relation by screws entering pillars or posts 59.

From what has been said it will be seen that during the progress of voting an accurate register is kept in the voters' booth of all the votes cast for any number of candidates for office or for or against any number of measures, while in the judges' booth is registered the aggregate number of persons who may have entered the voters' booth and exercised the privilege of voting. It will also be seen that if a person should enter the voters' booth and fail to vote that no one of the push-bars K will have been reciprocated, and hence the lower end of the lever 31 in the case B will remain against the stop 44 and cannot be acted upon by the radial arm 40, and therefore no alarm can be given or registration made in the case B, thus clearly indicating that such person has failed to vote, and as his name is called from the registration-book he is of course known, and the fact that he failed to vote may be noted opposite his name.

When the poll has closed and voting has ceased, the two parts of the machine are disassociated by disconnecting the bar 47 from the transverse bar 48, and the register of the number of voters which is contained in the case B will be seen through the window, similar to the window S in the section E, but which is omitted from the drawing to avoid confusion of lines in the top of said case, and is subject to the inspection of the judges, who can in accordance with the interests they represent make a note of the same for any future use, and the case, with its contained register, may be given into any proper custody.

The reel 52, from which the record-tape is moved, may be rotated by any suitable key to rewind the tape upon it whenever the machine is to be subsequently used. That part of the machine located in the voters' booth is then segregated by removing the dual sections D E from the cabinet or frame, and each section D is removed from its companion section E, and in so doing the fixed keys V on the sections D are withdrawn from the locks U, whereupon the spring-latches W lock the tape-gears I, and hence the register cannot be tampered with without possession of an independent key, and it will be understood that all keys necessary for use in connection with the machine may be of any preferred design.

Having described the construction and operation of my improved voting-machine and desiring it to be understood that many variations may be made in the details of construction without departing from the spirit of my invention, what I claim as new, and desire to secure by Letters Patent, is—

1. In a voting-machine, means for registering a voter's preference for one candidate only for any given office, or for or against any given measure, means connected with said registering mechanism for automatically preventing the register of a vote but for one candidate for any one office or one vote on any given measure; a second registering mechanism independent and separable from the primary register, and adapted to be operated at a different locality by a person other than the voter to register serially the number of voters using the primary registering devices, and means intermediate of the two separate and separable registering mechanisms adapted to alternately restore the said registering mechanisms to their normal operative conditions, through the medium of the legitimate and alternate use of the respective registering mechanisms, substantially as hereinbefore set forth.

2. In a voting-machine, the voter's registering mechanism made in two separate and separable sections, one provided with a series of push buttons or plates indicating the candidates or measures to be voted, mechanism cooperating with such push buttons or plates for operating the registering mechanism in the adjacent section, and means for automatically placing the registering mechanism in operative or inoperative condition; and an adjacent section provided with registering mechanism adapted to be operated by the push buttons or plates and intermediate devices of the other section, and with means cooperating with the devices of the upper section for automatically rendering the registering mechanism operative when the two sections are in proper relation with one another, and locking said registering mechanism when the two sections are separated, substantially as hereinbefore set forth.

3. In a voting-machine, the voter's registering mechanism composed of an upper and a lower section, the upper section provided with mechanisms for operating registering devices in the lower section, and with means connected with the several operating mechanisms for automatically locking all of said operating mechanisms except the one used, and a lower section provided with registering devices corresponding with each of the operating mechanisms, and with means for automatically locking the registering devices whenever the two sections are separated, substantially as and for the purpose set forth.

4. In a voting-machine, means for registering the preference of a voter, consisting of two separable sections, the upper one containing means for operating the registering devices in the other, and fixed keys adapted to enter locks within the lower section, and the lower one containing registering devices adapted to be acted upon by the operating mechanism of the upper section, and with locks adjacent to the registering devices adapted to receive the fixed keys of the upper section, whereby the registering devices are free to be operated when the two sections are in coöperative relation, and are automatically locked when the two sections are separated, substantially as hereinbefore set forth.

5. In a voting-machine such as described a series of push plates or buttons coöperating with a series of vibrating levers having a series of gates at the free ends thereof and pivotally connected at the opposite end with a vibrating arm connected at its opposite end with a bell-crank lever, said bell-crank lever pivotally connected with an end of a dog-lever adapted to rotate a registering device, and provided at its free end with a pin or stud to coöperate with a dual cam for depressing the dog-lever during its forward movement and lifting the same during the reverse movement, substantially as hereinbefore set forth.

6. In a voting-machine such as described in combination with the push plates or buttons, vibrating gated levers, pivoted dog-levers and intermediate multiplying lever devices and bell-crank levers 15, locking-plates L', L², L³, L⁴ provided with lock-blocks O, platforms N, and push-bars K, provided with pins 25 in advance of pins 28 on the bell-crank levers, whereby when any given push plate or button is depressed and the bell-crank lever is rocked, the push-plates will be reciprocated and all other push plates or buttons locked, substantially as and for the purpose set forth.

7. In a voting-machine a registering mechanism consisting of a pair of gears provided with meshing peripheries of saw-tooth design inclined in reverse directions respectively, tape having serial numbers printed thereon located between and within the bite of the peripheries of the gears, and means for rotating one of said gears predetermined distances, substantially as hereinbefore set forth.

8. In a registering mechanism such as described, in combination with the tape-feeding gears having intermeshing peripheries of saw-tooth design, and a tape provided with serial numbers, interposed between the bite of the teeth of the gears, a latch or bolt adapted to interlock with the teeth on the periphery of one of the gears when desired, substantially as hereinbefore set forth.

9. In a voting-machine such as described, in combination with the voters' registering devices, mechanism for operating the registering devices, reciprocating locking-plates for automatically locking the registering mechanisms other than the one used, and a reciprocating push-bar for restoring the locking-plates to their normal positions, an independent registering mechanism provided with a reciprocating rod or arm, connected with the reciprocating push-bar of the primary registering mechanism, whereby the operation of the secondary registering mechanism will restore the primary registering mechanism to normal conditions substantially as hereinbefore set forth.

10. In a voting-machine such as described the judges' registering and alarm mechanism B, consisting of a traveling tape with serial numbers thereon, tape-feeding gears between which the tape is fed, a ratchet upon one of the said gears, a vibrating lever with a spring-tappet at its free end for operating a bell-hammer, a spring pawl or latch pivoted to the vibrating lever and coöperating with the ratchet on the tape-gear, a radial arm for vibrating the lever and a spring for restoring the crank-arm to its normal position, substantially as hereinbefore set forth.

In testimony whereof I affix my signature in presence of two witnesses.

HENRY BOUNDS CARY.

Witnesses:
 E. C. WEBSTER,
 D. G. STUART.